United States Patent
Montboeuf et al.

(10) Patent No.: US 10,723,194 B2
(45) Date of Patent: Jul. 28, 2020

(54) SUSPENSION THRUST BEARING UNIT

(71) Applicant: Aktiebolaget SKF, Gothenburg (SE)

(72) Inventors: Bruno Montboeuf, Saint-Cyr-sur-Loire (FR); Francois De Lemps, Saint-Cyr-sur-Loire (FR); Julien Maffucci, Fondettes (FR)

( * ) Notice: Subject to any disclaimer, the term of this patent is extended or adjusted under 35 U.S.C. 154(b) by 0 days.

(21) Appl. No.: 16/373,716

(22) Filed: Apr. 3, 2019

(65) Prior Publication Data
US 2019/0308479 A1  Oct. 10, 2019

(30) Foreign Application Priority Data
Apr. 10, 2018  (DE) .......................... 10 2018 205 359

(51) Int. Cl.
*F16C 19/00* (2006.01)
*B60G 15/06* (2006.01)

(52) U.S. Cl.
CPC ...... *B60G 15/068* (2013.01); *B60G 2204/128* (2013.01); *B60G 2204/1242* (2013.01); *B60G 2204/418* (2013.01); *F16C 2326/05* (2013.01)

(58) Field of Classification Search
CPC .............. F16C 2326/05; B60G 15/068; B60G 2204/1242; B60G 2204/128; B60G 2204/418
See application file for complete search history.

(56) References Cited

U.S. PATENT DOCUMENTS

| | | | | |
|---|---|---|---|---|
| 8,226,301 B2* | 7/2012 | Poulle | .................... | B60G 11/15 384/609 |
| 8,496,383 B2* | 7/2013 | Viault | .................. | B60G 15/068 267/217 |
| 2010/0014792 A1* | 1/2010 | Kellam | ................ | B60G 15/067 384/196 |
| 2011/0262070 A1* | 10/2011 | Zernickel | ............. | B60G 15/068 384/618 |
| 2011/0274384 A1* | 11/2011 | Montboeurf | ......... | B60G 15/068 384/607 |
| 2012/0292841 A1* | 11/2012 | Corbett | ................ | B60G 15/068 267/217 |
| 2018/0372152 A1* | 12/2018 | Gaultier | .................. | F16C 19/10 |

FOREIGN PATENT DOCUMENTS

EP         2152531        2/2010

* cited by examiner

*Primary Examiner* — Thomas R Hannon
(74) *Attorney, Agent, or Firm* — Reed Smith LLP

(57) ABSTRACT

A suspension thrust bearing unit for use in an automotive suspension assembly having a lower annular cap rotatable with respect to an upper annular cap and delimiting together an annular chamber that houses a rolling bearing. The lower annular cap provides a subassembly for damping vibrations and distributing stress being provided with a lower support surface that axially supports an upper end of a suspension spring. The subassembly includes an annular stiffening cup made from a metal material and mounted to the lower cap, and an annular damping device made from a resilient material and mounted to the stiffening cup. The stiffening cup having at least one protruding portion formed by stamping and that extends towards the damping device, the damping device being locally deformed by the protruding portion and forming a recess to receive the protruding portion.

9 Claims, 4 Drawing Sheets

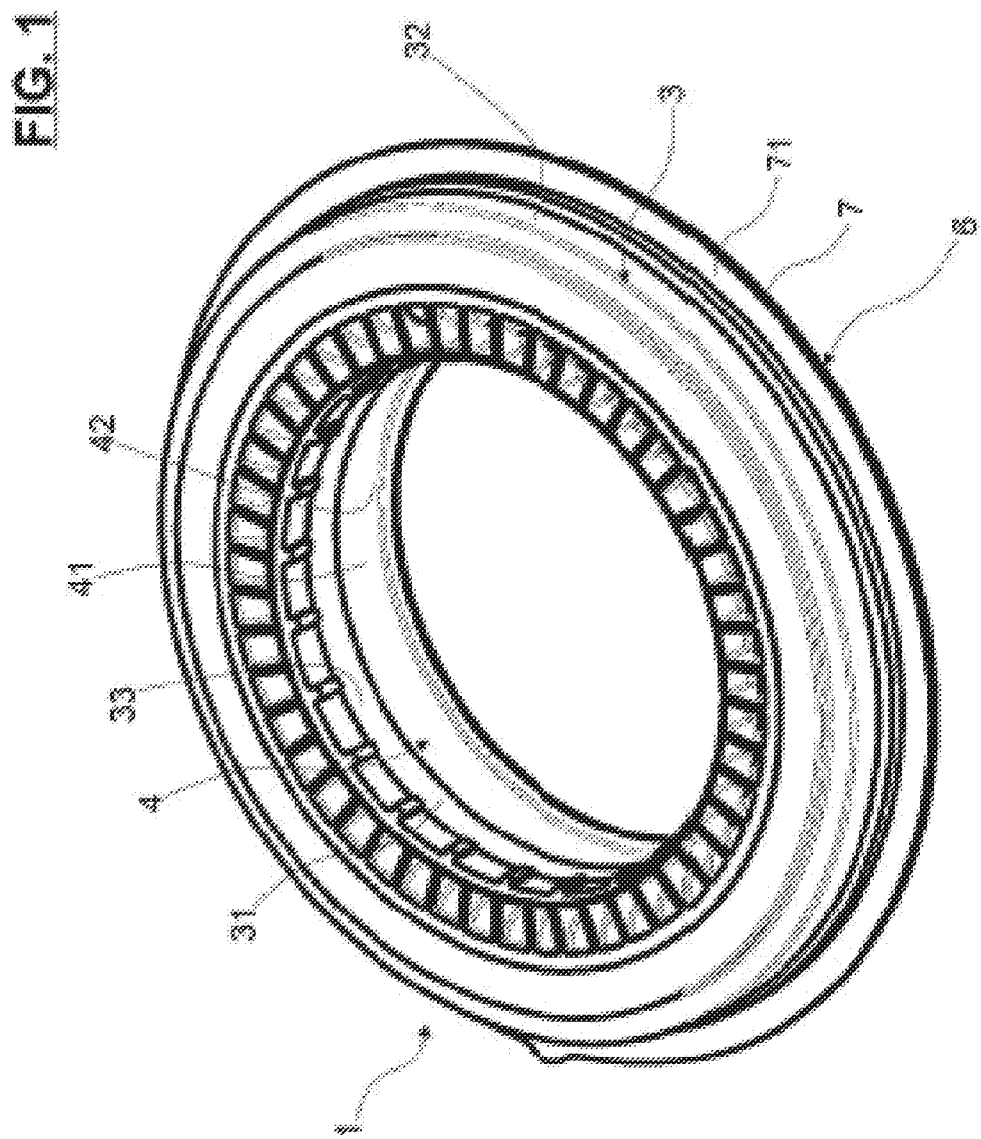

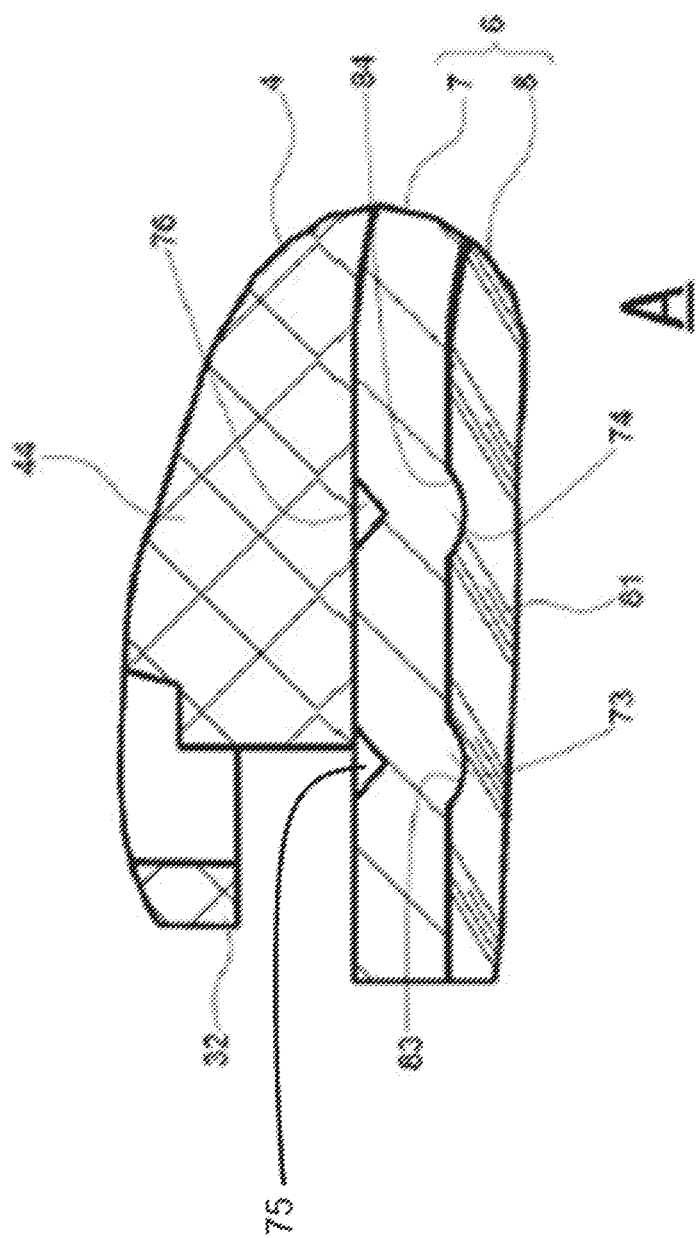

SUSPENSION THRUST BEARING UNIT

CROSS-REFERENCE

This application claims priority to German patent application no. 102018205359.6 filed on Apr. 10, 2018, the contents of which are fully incorporated herein by reference.

TECHNOLOGICAL FIELD

The present invention concerns the field of suspension thrust bearing units, in particular of the MacPherson type. Such suspension thrust bearing unit equip a suspension assembly for use in a motor vehicle.

BACKGROUND

As a general rule, a motor vehicle suspension system comprises a suspension assembly supporting an axle and a vehicle wheel. A suspension thrust bearing unit is disposed in an upper portion of the suspension assembly, opposite to the wheel and the ground, and between a suspension spring and an upper support block attached to the body of the vehicle.

The suspension thrust bearing unit includes at least one rolling bearing.

The suspension thrust bearing unit enables transmission of axial forces between the spring and the body of the vehicle and, in the meantime, allows relative angular movement between the spring, which is mobile in rotation, and the fixed support block attached to the body.

To this end, the spring is supported by a spring seat provided on the suspension thrust bearing unit. More precisely, the suspension thrust bearing comprises a lower cap with a lower support surface resting on ending coils of the spring. The spring support surface comprises a radial surface to support axial force. The spring support surface may also comprise a tubular axial surface to support radial deformations and to ensure the spring centering.

It is known from US 2010/0014792 A1 and EP 2 152 531 B1 to provide a damping device axially and radially disposed between the spring and the spring support surface of the suspension thrust bearing unit. As shown in these documents, the damping device is attached to the lower surface of the unit. Damping device is made from a resilient material, such as rubber, thermoplastic elastomer (TPE), in particular thermoplastic polyurethane (TPU), melt processible elastomer (MPE).

However, such a damping device may have some disadvantages. Indeed, unless having a damping device of important thickness, the ending coil of spring causes high concentration of stress to the lower cap. This results in a risk of premature fatigue and cracking of lower cap that can cause malfunction of suspension thrust bearing unit.

The damping device may also have a relative displacement with respect to the lower cap, that can increase the damping device wear.

SUMMARY

The aim of the invention is to provide a suspension thrust bearing unit with an improved damping device having optimized performances for load support and damping functions.

It is another object of the invention to provide a suspension thrust bearing unit having an easy and economic manufacturing process.

To this end, the invention concerns a suspension thrust bearing unit for use in an automotive suspension assembly. The suspension thrust bearing unit comprises a lower annular cap rotatable with respect to an upper annular cap and delimiting together an annular chamber wherein a rolling bearing is housed. The lower annular cap comprises a sub-assembly for damping vibrations and distributing stress. The sub-assembly is provided with a lower support surface that axially supports an upper end of a suspension spring.

According to the invention, the sub-assembly comprises an annular stiffening cup made from a metal material and mounted to the lower cap, and an annular damping device made from a resilient material and mounted to the stiffening cup, the cup being arranged between the lower cap and the damping device. The stiffening cup comprises at least one protruding portion formed by stamping and that extends towards the damping device, the damping device being locally deformed by the protruding portion and forming a recess to receive the protruding portion.

Thanks to the invention, the resilient damping device permits to efficiently damp the vibrations. The metal stiffening cup permits to support load exerted by the suspension spring, and to distribute the stress circumferentially.

The stiffening cup and the damping device form a sub-assembly that can be manufactured separately and assembled to the lower cap of the suspension thrust bearing unit. The unit can be standardized, the sub-assembly being an optional feature. It permits to reduce the manufacturing and storing costs and simplifying the stock logistics.

Another advantage of the present invention is that the stiffening cup and the damping device are provided with retaining means. The at least one protruding portion provided to the stiffening cup cooperates with a corresponding recess of the damping device to prevent any relative displacement between the two elements. It permits to reduce wear and to maintain the relative position of the damping device and stiffening cup during the suspension thrust bearing unit service life.

The at least one protruding portion of the metal stiffening cup is formed by the well-known process of stamping. It permits an easy and economic manufacturing process of the sub-assembly.

According to further aspects of the invention which are advantageous but not compulsory, such a suspension thrust bearing unit may incorporate one or several of the following features:

The rolling bearing comprises an outer ring mounted inside the annular upper cap, an inner ring mounted inside the annular lower cap, and at least one row of rolling elements positioned between raceways defined by lower and inner rings.

The rolling elements are balls.

The inner and outer rings are made from a stamped metal sheet.

The upper and lower caps are made from a rigid plastic material, for example polyamide, optionally reinforced with glass fibers.

The upper and/or lower caps may comprise stiffening insert.

The lower cap comprises an axial hub and an outwardly projected radial flange extending from the hub.

The stiffening cup and the damping device comprise each a radial portion covering a lower surface of radial flange of lower cap.

The at least one protruding portion is provided to the radial portion of stiffening cup, and axially downwardly extends in a recess formed to the radial portion of damping device.

The stiffening cup comprises a tubular axial portion covering an outer surface of axial hub of lower cap.

The damping device comprises a tubular axial portion covering an outer surface of the tubular axial portion of stiffening cup.

The at least one protruding portion is provided to the tubular axial portion of stiffening cup, and radially outwardly extends in a recess formed to the tubular axial portion of damping device.

The stiffening cup comprises a plurality of protruding portions formed by stamping and axially circumferentially spaced apart.

The protruding portion is annular.

The metal stiffening cup is made from steel.

The damping device is made from a resilient material, such as rubber, thermoplastic elastomer (TPE), in particular thermoplastic polyurethane (TPU), melt processible elastomer (MPE) or cellular polyurethane.

The damping device is molded onto the stiffening cup.

The damping device is fitted onto the stiffening cup.

BRIEF DESCRIPTION OF THE DRAWINGS

The invention will now be explained in correspondence with the annexed figures, as an illustrative example, without restricting the object of the invention. In the annexed figures:

FIG. 1 is a perspective top view of a suspension thrust bearing unit;

FIG. 3 is a detailed view in axial section of the unit of FIG. 2A

DETAILED DESCRIPTION

Figure 2A:
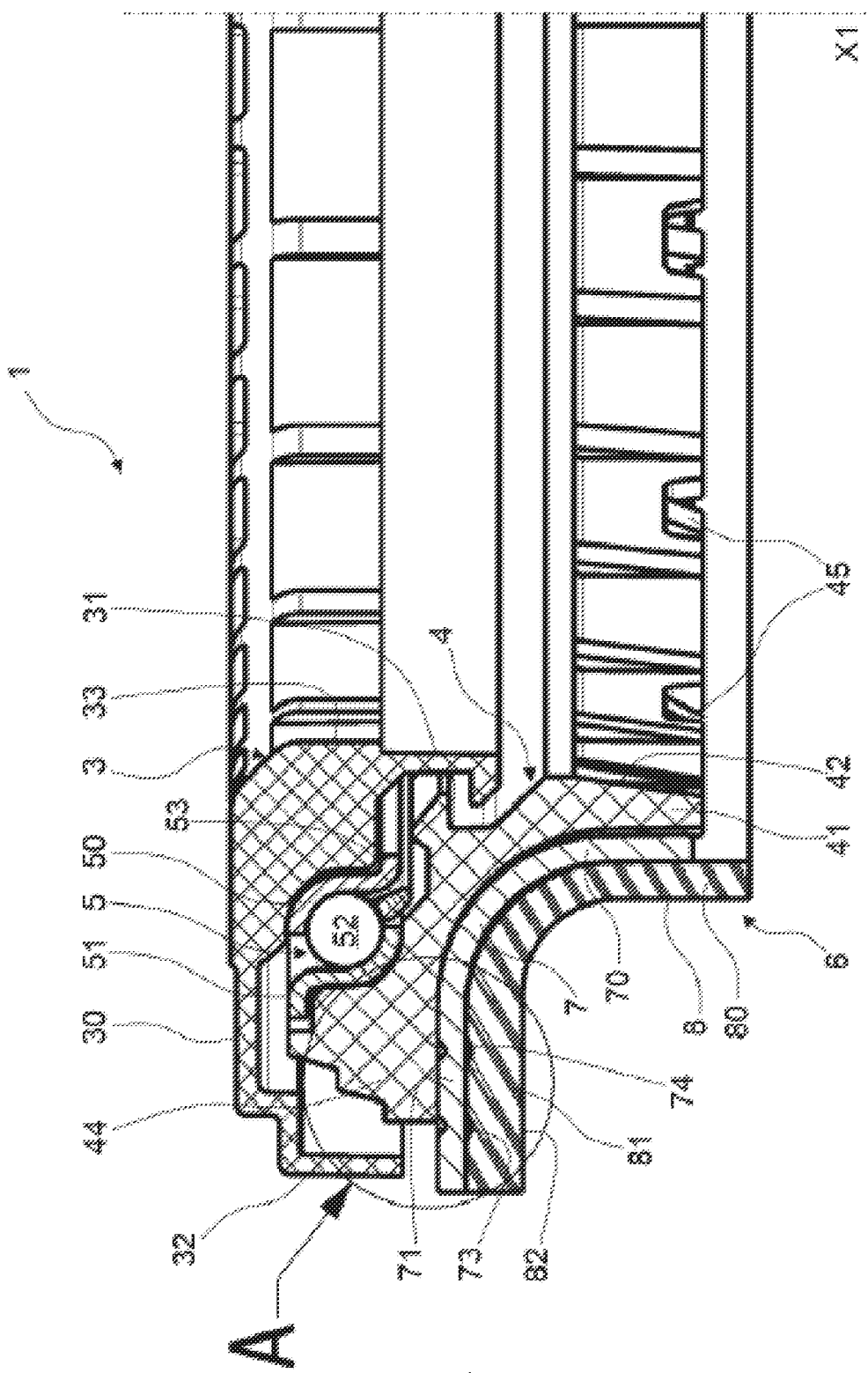
FIGS. 2A and 2B are half-view in axial sections of unit of FIG. 1 according to a embodiments of the invention.
Figure 2B:
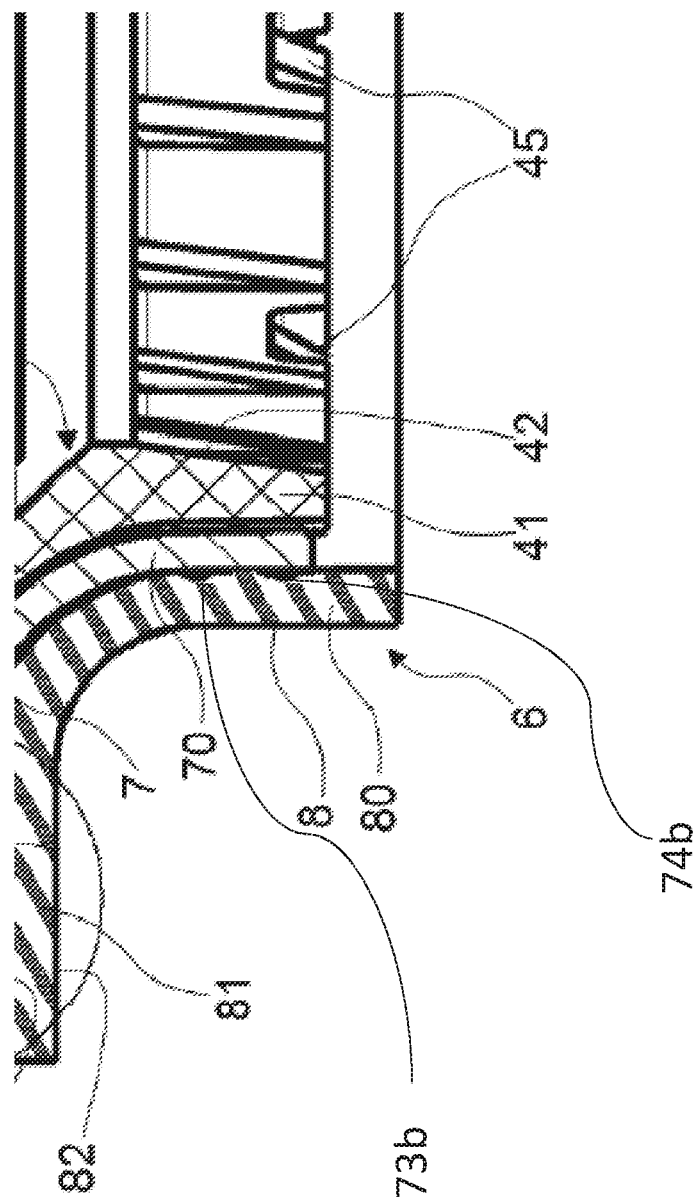

A suspension thrust bearing unit 1 with central axis X1 is mounted between a helical suspension spring (not shown) and a support block (not shown) connected to the chassis of a motor vehicle. Such suspension thrust bearing unit 1 can be used, for example, in an automotive MacPherson strut assembly.

Hereinafter, the adjectives "axial" and "radial" are defined relative to the central axis X1 of the annular thrust bearing 1.

The suspension thrust bearing unit 1 comprises an annular upper cap 3, an annular lower cap 4 and a single rolling bearing 5. These three components 3, 4 and 5 are of globally circular shape about central axis X1.

The upper cap 3 consists in a one-piece part made from plastic synthetic material, for example from polyamide, optionally reinforced with glass fibers. The upper cap 3 has an upper radial portion 30, an annular inner skirt 31, and annular outer skirt 32. Annular inner skirt 31 is of relatively small diameter and extends from inner periphery of upper radial portion 30 and towards the lower side of the suspension thrust bearing unit 1. Annular outer skirt 32 is of larger diameter than the inner skirt 31 and extends towards the lower side of the suspension thrust bearing unit 1.

The upper cap 3 is dedicated to be fixed to a support block (not shown) of the automotive vehicle chassis. The annular lower cap 4 is rotatable with respect the annular upper cap 3 around central axis X1.

Lower cap 4 comprises a hub 41 defining an inner bore 42. The inner skirt 31 defines an inner bore 33 for the suspension thrust bearing unit 1, an elongate shock absorber rod (not shown) being mounted in bores 33, 42.

The lower cap 4 further comprises a radial portion 44 that radially outwardly extends from the hub 41 towards the exterior of the suspension thrust bearing unit 1.

Lower cap 4 and upper cap 3 delimit together an annular chamber wherein the rolling bearing 5 is housed.

Rolling bearing 5 comprises a pressed sheet metal inner ring 50, an outer ring 51 also of pressed sheet metal, a row of rolling elements 52, here balls, and a cage 53 for maintaining a regular circumferential spacing between the rolling elements 52. The rolling elements 52 are disposed between raceways formed by toroidal portions of the inner ring 50 and outer ring 51. As an alternative not shown, rolling elements may be rollers.

The rolling bearing 5 is integrally radially located between the inner skirt 31 and the outer skirt 32 of the upper cap 3. The inner ring 50 is fitted within a toroidal inner portion of the upper radial portion 30 of upper cap 3. The outer ring 51 is fitted onto a toroidal outer portion of the radial portion 44 of lower cap 4.

The lower cap 4 further comprises a sub-assembly 6 for filtering vibrations and distributing stress. The sub-assembly comprises a stiffening cup 7, and a damping device 8.

The stiffening cup is made from a metal material, for example steel. The damping device is made from a resilient material, such as rubber, thermoplastic elastomer (TPE), in particular thermoplastic polyurethane (TPU), melt processible elastomer (MPE) or cellular polyurethane for example.

The stiffening cup 7 is annular and has an L-shape in axial cross section. The cup 7 comprises a tubular axial portion 70 mounted onto an outer surface of hub 41 of lower cap 4. The cup 7 also comprises a radial portion 71 that radially outwardly extends from the axial portion 70. The axial portion 71 is in axial abutment against a lower surface of radial portion 44 of lower cap 4. The stiffening cup 7 is substantially of corresponding shape with the lower side of lower cap 4.

The damping device 8 comprises and a tubular axial damping portion 80 and a radial damping portion 81. The axial damping portion 80 is mounted onto an outer surface of axial portion 70 of stiffening cup 70.

Hub 41 of lower cap 4, by the intermediate of tubular axial portions 70, 80 of the sub-assembly 6, supports radial load and shocks from the suspension spring, and also permits to damp vibrations.

The radial damping portion 81 comprises an upper side in axial abutment against a lower surface of the radial portion 71 of stiffening cup 7, and a lower radial side forming a spring seat 82 dedicated to receive an end turn of a suspension spring in bearing contact.

Radial portion 44 of lower cap 4, by the intermediate of radial portions 70, 80 of the sub-assembly 6, supports axial load and shocks from the suspension spring, and permits to damp vibrations.

The stiffening cup 7 and the damping device 8 are of corresponding shape, and in contact with each other. The damping device 8 is mounted onto the stiffening cup 7, the stiffening cup 7 being mounted onto the lower cap 4. The sub-assembly 6 is formed by the stiffening cup 7 and the damping device 8 and is an intermediate damping element between the lower cap 4 and a suspension spring.

The damping device 8 may be fitted to the stiffening cup 7. Alternatively, the damping device 8 may be overmoulded onto the stiffening cup 7.

Advantageously, the lower end of axial hub 41 of lower cap 4 comprises a plurality of tongues 45 to axially retain the sub-assembly 6.

Tongues 45 obliquely outwardly extend from the outer surface of hub 41, the tongues 45 being in radial projection with respect to the hub 41.

Free ends of tongues 45 are of diameter strictly greater than the inner diameter of axial portion 70 of stiffening cup 7.

During assembly of the sub-assembly 6 onto the lower cap 4, the tongues 45 are inwardly deformed by the insertion of tubular axial portion 70 of stiffening cup 7. Then the tongues 45 return to their original shape to ensure the axial maintain of sub-assembly 6 with the lower cap 4.

According to the invention, the radial portion 71 of stiffening cup 7 comprises protruding portions 73, 74.

The protruding portions 73, 74 are formed by axial stamping and extend axially downwardly towards the radial portion 81 of damping device 8. Corresponding recesses 75, 76 are formed during the stamping process on the opposite axial side of radial portion 71.

The radial portion 81 of damping device 8 is locally deformed by the protruding portions 73, 74, and form corresponding recesses 83, 84, respectively, to receive the protruding portions.

In the illustrated embodiment, the radial portion 71 of stiffening cup 7 comprise a first protrusion 73, and a second protrusion 74 at a smaller diameter than the first protrusion. Alternatively, the radial portion 71 may comprise only one protrusion or more than two protrusions.

The stiffening cup 7 may comprise a plurality of protruding portions 73 formed by stamping and axially circumferentially spaced apart. Similarly, the stiffening cup 7 may comprise a plurality of protruding portions 74 formed by stamping and axially circumferentially spaced apart. Alternatively, the protruding portion 73 and/or the protruding portion 74 is annular.

As an alternate embodiment of the invention, the at least one protruding portion, e.g., 73b, 74b, is provided to the tubular axial portion 70 of stiffening cup 7, and radially outwardly extends in a recess formed to the tubular axial portion 80 of damping device 8.

Alternatively, the stiffening cup may comprise at least one protruding portion to the axial portion, and at least one protruding portion to the radial portion.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension thrust bearing unit.

Moreover, various features of the above-described representative examples, as well as the various independent and dependent claims below, may be combined in ways that are not specifically and explicitly enumerated in order to provide additional useful embodiments of the present teachings.

What is claimed is:

1. A suspension thrust bearing unit for use in an automotive suspension assembly, the thrust bearing unit comprising:
   a lower annular cap rotatable with respect to an upper annular cap, and delimiting together an annular chamber wherein a rolling bearing is housed,
   the lower annular cap comprising a subassembly for damping vibrations and distributing stress, the subassembly being provided with a lower support surface that axially supports an upper end of a suspension spring, wherein
   the sub-assembly comprises an annular stiffening cup made from a metal material and mounted to the lower cap,
   an annular damping device made from a resilient material and mounted to the stiffening cup,
   the stiffening cup being arranged between the lower cap and the damping device,
   the stiffening cup comprising at least one protruding portion formed by stamping and that extends towards the damping device, and
   the damping device being locally deformed by the protruding portion and forming a recess to receive the protruding portion.

2. The suspension thrust bearing unit according to the claim 1, wherein the lower cap comprises an axial hub and an outwardly projected radial flange extending from the hub.

3. The suspension thrust bearing unit according to the claim 2, wherein the stiffening cup and the damping device each comprise a radial portion covering a lower surface of the radial flange of the lower cap.

4. The suspension thrust bearing unit according to the claim 3, wherein the at least one protruding portion is provided to the radial portion of stiffening cup, and axially downwardly extends in a recess formed to the radial portion of damping device.

5. The suspension thrust bearing unit according to claim 2, wherein the stiffening cup comprises a tubular axial portion covering an outer surface of the axial hub of the lower cap.

6. The suspension thrust bearing unit according to the claim 5, wherein the damping device comprises a tubular axial portion covering an outer surface of the tubular axial portion of stiffening cup.

7. The suspension thrust bearing unit according to the claim 6, wherein the at least one protruding portion is provided to the tubular axial portion of the stiffening cup, and radially outwardly extends in a recess formed to the tubular axial portion of the damping device.

8. The suspension thrust bearing unit according to claim 1, wherein the stiffening cup comprises a plurality of protruding portions axially circumferentially spaced apart and formed by stamping.

9. The suspension thrust bearing unit according to claim 1, wherein the protruding portion is annular.

* * * * *